US009688782B2

(12) United States Patent
Wendler et al.

(10) Patent No.: US 9,688,782 B2
(45) Date of Patent: Jun. 27, 2017

(54) METHOD FOR SEPARATION OF A POLYMER FROM A POLYMER SOLUTION OR DISPERSION

(71) Applicant: Fraunhofer-Gesellschaft Zur Förderung Der Angewandten Forschung E.V., München (DE)

(72) Inventors: Ulrich Wendler, Halle (DE); Marcus Vater, Halle (DE); Carsten Gehrhardt, Merseburg (DE); Frank Herzig, Kabelsketal / OT Gottenz (DE)

(73) Assignee: Fraunhofer-Gesellschaft Zur Förderung Der Angewandten Forschung E.V., München (DE)

( * ) Notice: Subject to any disclaimer, the term of this patent is extended or adjusted under 35 U.S.C. 154(b) by 0 days.

(21) Appl. No.: 14/781,973

(22) PCT Filed: Mar. 24, 2014

(86) PCT No.: PCT/EP2014/055826
§ 371 (c)(1),
(2) Date: Jan. 14, 2016

(87) PCT Pub. No.: WO2014/161735
PCT Pub. Date: Oct. 9, 2014

(65) Prior Publication Data
US 2016/0137757 A1    May 19, 2016

(30) Foreign Application Priority Data

Apr. 4, 2013  (DE) .................. 10 2013 205 990

(51) Int. Cl.
| | |
|---|---|
| C08F 120/18 | (2006.01) |
| C08F 36/00 | (2006.01) |
| C08F 236/00 | (2006.01) |
| B01D 24/00 | (2006.01) |
| C08F 6/12 | (2006.01) |
| C08C 2/06 | (2006.01) |
| C08F 6/00 | (2006.01) |
| C08F 6/10 | (2006.01) |
| C08F 6/14 | (2006.01) |
| B01D 1/20 | (2006.01) |
| B01D 19/00 | (2006.01) |
| B01D 45/14 | (2006.01) |

(52) U.S. Cl.
CPC ............. *C08F 6/12* (2013.01); *B01D 1/20* (2013.01); *B01D 19/0042* (2013.01); *B01D 45/14* (2013.01); *C08C 2/06* (2013.01); *C08F 6/003* (2013.01); *C08F 6/10* (2013.01); *C08F 6/14* (2013.01)

(58) Field of Classification Search
CPC .... C08C 2/06; C08F 6/003; C08F 6/10; C08F 6/12; C08F 6/14; B01D 1/20; B01D 19/0042; B01D 45/14
USPC ............... 526/329.7, 335, 339, 340; 210/188
See application file for complete search history.

(56) References Cited

U.S. PATENT DOCUMENTS

| | | | | |
|---|---|---|---|---|
| 2,049,943 | A | * 8/1936 | Bromig | ................ C08J 3/12 528/489 |
| 3,457,248 | A | 7/1969 | Cunningham et al. | |
| 4,985,136 | A | * 1/1991 | Bartholic | ................ B01J 8/085 208/113 |

FOREIGN PATENT DOCUMENTS

| | | |
|---|---|---|
| DE | 660 046 C | 5/1938 |
| DE | 3712798 A1 | 11/1988 |
| GB | 1126743 A | 9/1968 |

OTHER PUBLICATIONS

International Search Report for International Application No. PCT/EP2014/055826, mailed Jun. 16, 2014.

* cited by examiner

*Primary Examiner* — William Cheung
(74) *Attorney, Agent, or Firm* — Warn Partners, P.C.

(57) ABSTRACT

The present invention relates to a method for separation of a polymer from a polymer solution or dispersion, wherein (i) a solution or dispersion of a polymer in an organic solvent is atomized by being brought into contact with water vapor in an atomizer container; (ii) the mixture obtained in the atomizer container is routed into a polymer degasification container and flows through same, wherein the organic solvent present in the polymer particles is driven at least partially out of the polymer particles due to the thermal contact between the polymer particles and the water vapor and transitions into the gas phase (iii) the mixture exiting from the polymer degasification container is routed into a phase separator (1) and the organic solvent present in the gas phase is separated from the polymer particles and the condensed water vapor; and (iv) the polymer particles and the condensed water vapor are routed into a phase separator (2) in order to separate the polymer particles from the condensed water vapor.

15 Claims, No Drawings

METHOD FOR SEPARATION OF A POLYMER FROM A POLYMER SOLUTION OR DISPERSION

CROSS REFERENCE TO RELATED APPLICATIONS

This application is a National Stage of International Application No. PCT/EP2014/055826, filed Mar. 24, 2014. This application claims priority to German Patent Application No. 10 2013 205 990.6 filed on Apr. 4, 2013. The disclosures of the above applications are incorporated herein by reference.

The present invention relates to a process for separating a polymer from a polymer solution or dispersion, as well as a device or system, respectively, for carrying out this process.

The solution polymerization is an industrially important production process of polymers. In order to recover the polymer, the solvent is to be separated. However, some organic solvent still remains in the polymer material and may cause a problem. Since legal regulations and stricter environmental requirements often require only a very low residual content of volatile organic compounds, there is a need for an efficient process to separate the polymer from a polymer solution. The compactness of the chemical engineering construction and the energy-saving and resource-saving implementation of the process, while largely avoiding product damage, are of particular importance.

It is known to perform the solvent removal during the solution polymerization of polymers (such as e.g. elastomers) via coagulation/stripping. After atomizing with water vapor, the resulting mixture is transferred to a stirred tank. In this container the polymer particles are present dispersed in liquid water. While heating, the still residual solvent is transferred from the polymer particles into the liquid aqueous phase and from there into the gas space. In order to expell the organic solvent in a sufficient amount from the polymer particles, a longer residence time of this aqueous polymer suspension is required in the stirred container. The aqueous polymer suspension is usually transferred to at least another stirred vessel. In analogy with the first apparatus (which may be under reduced pressure) a further evaporation of the solvents from the polymer particles is achieved by heat energy. This process is relatively time-consuming. The average residence time of polymer can be e.g. up to 2 hours in such a unit, which in turn leads to a high thermal load on the polymer. Furthermore, such units often must have certain minimum dimensions in order to ensure a stable operation. Thus, a minimum throughput is required for a profitable operation. An adjustment to small tonnages of (special) products is difficult.

An object of the present invention is to provide a process for separating a polymer from a polymer solution, which process can be carried out in an energy-saving and resource-saving manner, while largely avoiding product damage, and which process allows for a compact chemical engineering construction. Another object of the present invention is to provide an apparatus or unit, respectively, for carrying out the process as efficiently as possible.

This object is achieved by a process for separating a polymer from a polymer solution or a polymer dispersion comprising the following steps:
(i) a solution or dispersion of a polymer in an organic solvent is sprayed in a vaporizer by bringing it into contact with water vapor, wherein a part of the organic solvent is converted into gas phase, a part of the water vapor condenses in the form of droplets and polymer particles are obtained which still contain organic solvent,
(ii) the mixture obtained in the vaporizer is transferred into a polymer degassing container and flows through the polymer degassing container, where by thermal contact of the polymer particles and the water vapor the organic solvent contained in the polymer particles is at least partially removed from the polymer particles and converted into gas phase,
(iii) the mixture leaving the polymer degassing container is transferred into a phase separator 1 where the organic solvent contained in the gas phase and, if still present, the water vapor, are separated from the polymer particles and the condensed water vapor,
(iv) the separated polymer particles and the separated condensed water vapor from step (iii) are transferred into a phase separator 2 where the polymer particles are separated from the condensed water vapor.

The term "water vapor" means in the context of the present invention water in the gaseous state.

The inventive process is applicable to a variety of different polymers and polymer solutions. For example, it may be that the polymer is an elastomer, a thermoplastic or a mixture of these polymers. Polybutadiene, random copolymers of styrene, and butadiene as well as EP(D)M can be mentioned as exemplary elastomers. Poly(meth)acrylates such as PMMA can be mentioned as exemplary thermoplastics.

Suitable organic solvents for the polymers are basically known in the art. The solvent can be a polar or a nonpolar solvent or mixtures of these solvents depending on the type of polymer. Exemplary non-polar solvents are aliphatic or cycloaliphatic solvents or mixtures thereof. Exemplary polar solvents are ethers or alkyl acetate (e.g. long chain alkyl acetate). The polymer solution used in the step (i) is usually the polymer solution obtained at the end of a solution polymerization from which the polymer is to be separated by the process according to the invention.

In the present invention, the polymer solution introduced into the vaporizer can also contain water in addition to the organic solvent. It is only important that the organic solvent is present in an amount to at least partially dissolve or disperse the polymer.

The solid content of the polymer solution in step (i) may vary in the present invention over a wide range and is, for example, 5-40% by weight, more preferably 10-30 wt % or 12-25 wt %.

As mentioned above, in step (i) of the inventive process, the polymer solution or dispersion is sprayed by contacting with water vapor. Such an atomization using water vapor and suitable equipment elements therefore are basically known to the skilled person.

For example, the polymer solution can be brought into contact with the water vapor in a multiple fluid nozzle (as a two-component or three-component nozzle). If in addition to the polymer solution and the water vapor further optional components are to be introduced into the vaporizer, a three-component nozzle may be preferred. Such an optional component may be e.g. washing water to which optionally further additives may be added.

The opening through which the water vapor is introduced into the vaporizer may have different shapes. For example, this opening can be circular or oval or alternatively, slit-shaped. In the present invention, it is possible that the water vapor is introduced only via an opening or alternatively via two or more openings into the vaporizer.

Introducing the polymer solution into the vaporizer can be performed via customary equipment elements which are known to the skilled person. For example, the polymer solution can be introduced into the vaporizer through holes in the wall of the vaporizer, preferably cylindrical and/or conical holes.

Depending on the type of polymer and polymer concentration a bore diameter of 0.1 to 8 mm, more preferably 0.5 to 6 mm, or 1.0 to 5.0 mm has been proven to be expedient. However, other bore diameters are also usable in scope of the present invention.

In a preferred embodiment, the polymer solution enters the vaporizer at an angle of 45-100°, preferably 60-95°, more preferably 80-90° compared to the entering of the water vapor into the vaporizer. By this relative mutually orientation, an improved atomization of the polymer solution can be realized.

In principle, however, the inflow of the polymer solution and the inflow of water vapor may also be aligned parallel to the vaporizer in the process of the invention, provided that bringing them into contact results in a still sufficient atomization of the polymer solution.

By contacting the polymer solution with water vapor, on the one hand, atomization of the polymer solution is achieved and, on the other hand, a transfer of thermal energy occurs from the hot water vapor in the organic solvent. This in turn causes that a part of the organic solvent is transferred into the gas phase and a part of the water vapor is condensed in the form of droplets. Furthermore, polymer particles are formed due to the conversion of organic solvent into the gas phase. However, the thermal energy transfer from the water vapor to the polymer solution is not yet sufficient in order to obtain already in the vaporizer in step (i) polymer particles having the desired low content of organic solvent (such as e.g. required by legal regulations). Polymer particles obtained in the vaporizer still include organic solvent, which still has to be removed in one or more subsequent steps.

Pressure and temperature of the water vapor introduced into the vaporizer can be varied over a wide range. Likewise, the mass ratio of water vapor and polymer solution can be varied over a wide range.

However, it is important that the water vapor does not completely condense in step (i) so that in the subsequent step (ii) water vapor for a transfer of thermal energy to the polymer particles is still available in the polymer degassing container.

The water vapor introduced into the vaporizer may for example be saturated vapor or superheated vapor. The water vapor introduced into the vaporizer may have, for example, a pressure ranging from 3 bars to 25 bars, preferably 10 bars to 20 bars or 15 bars to 17 bars.

A suitable mass ratio of water vapor to the polymer solution in step (i) is for example in the range of 0.2 to 3, preferably in the range of 0.3 to 1.5, more preferably in the range of 0.4 to 1.2.

The size of the polymer particles formed in the vaporizer can be adjusted by suitable variation of the atomizing conditions (e.g. nozzle geometries, nozzle assembly, vapor velocities, additional washing water optionally if necessary with auxiliaries etc.). This is basically known to the skilled person.

In the present invention, the average diameter of the polymer particles formed in the vaporizer may be varied over a wide range and is for example in the range of 0.01-5 mm, preferably 0.5-3 mm or 1.0-1.5 mm. The determination of the mean particle diameter is carried out by image analysis evaluation, for example by optical evaluation under a light microscope having a scale. For this purpose, the polymer particles leaving the vaporizer can be separated and examined under the light microscope. The diameter of a polymer particle is calculated as the greatest extension of the particle recognizable under the microscope projection area. The mean particle diameter is obtained by averaging a sufficiently large number of polymer particles.

Average particle diameters being below or above the preferred ranges given above are also useful in the inventive process. However, the evaporation of the organic solvent that is still present in the polymer particles may be further optimized in step (ii), if the average diameter of the particles formed in the vaporizer is in the preferred ranges indicated above.

By atomizing in the vaporizer in step (i) a three-phase, i.e. solid, gaseous and liquid components containing mixture will be obtained. This three-phase mixture comprises at least water vapor, gaseous (i.e. vaporized by atomization) organic solvent, condensed water vapor in the form of droplets and solid polymer particles which still contain organic solvent.

As stated above, the resulting mixture contained in an vaporizer in step (ii) of the process is fed into a polymer degassing container and flows through the polymer degassing container, wherein the organic solvent present in the polymer particles is at least partially expelled from the polymer particles by the thermal contact between the polymer particles and the water vapor and is transferred into the gas phase.

Since the mixture obtained in vaporizer in step (i) still contains water vapor, this water vapor is available in polymer degassing container in step (ii) for another thermal energy transfer to the polymer particles. In the present invention it has been found that due to the direct thermal contact between polymer particles and water vapor in the polymer degassing container the organic solvent which still present in the polymer particles can be very effectively evaporated.

For establishing a thermal contact between the polymer particles and the water vapor, the temperature and pressure conditions in the polymer degassing container preferably are to be chosen such that the condensed water vapor is in droplet form and do not unify to form a single liquid phase in which the polymer particles would be dispersed. That setting of such conditions is readily possible to the skilled person in considering his general knowledge. By way of example in this context, a temperature may be mentioned in the range of 100-140° C. or 100-130° C. and a pressure in the range of 1-4 bar abs or 1-3 bar abs.

The dimensions and the geometry of the polymer degassing container can be varied over a wide range. A polymer degassing container, for example, that is at least in sections tubular, preferably over its entire length has been proven as expedient. A suitable length of such polymer degassing container, preferably a tubular polymer degassing container, is e.g. from 0.5 to 30.0 m, more preferably 2.0-20.0 or 4.0-10.0 m. A suitable diameter is for example in the range of 15-150 mm, preferably 25-100 mm or 40-80 mm.

Preferably, the polymer degassing container is operated in such a manner that the sprayed mixture of step (i) continuously flows through the polymer degassing container and expels the organic solvent present in the polymer particles at least partially by the thermal contact with the water vapor and the condensed water vapor in this flow is preferably in the form of droplets.

As the organic solvent, which still remains in the polymer particles can be very effective evaporated by thermal contact with the water vapor, a relatively low average residence time for the polymer degassing container can be selected, which in turn reduces the thermal load on the polymer particles.

On the other hand the mean residence time in the polymer degassing container is preferably selected adequately long in order to allow a nearly complete transfer of the thermal energy of the water vapor to the polymer particles, so that the mixture leaving the polymer degassing container has a very low water vapor content.

Preferably, the average dwell time in the polymer degassing container is 0.1-10 seconds, more preferably 0.1-7 seconds or 0.1-4 seconds.

In the present invention, the term "mean residence time" or "average dwell time" is used in his meaning being familiar to the person skilled in the art and is, therefore, derived from the quotient of the volume of the polymer degassing container to the exiting volume flow rate.

For the subsequent further processing of the polymer particles it may be advantageous that their average particle diameter increases by agglomeration of particles when staying in polymer degassing container. When leaving the polymer degassing container the average diameter of the polymer particles is preferably 0.5-40 mm, more preferably 2-20 mm or 5-10 mm. Regarding the particle size determination it may be referred to the above statements, i.e. the determination of the average particle diameter is carried out by image analysis evaluation processes, for example by optical evaluation under a light microscope having a scale. For this purpose, the polymer particles can be separated off when leaving the polymer degassing container and can be examined under the light microscope. Provided that the polymer particles formed in the vaporizer agglomerate to larger particles in the polymer degassing container, these particles often have a "raspberry" type morphology. The particle size of the polymer particles leaving the polymer degassing container can be controlled by the residence time in the degasification reactor. The longer the average residence time is the higher is the likelihood of an agglomeration of individual particles to form larger particles.

As stated above, in step (iii) of the process of the present invention the mixture leaving the polymer degassing container is passed into phase separator 1 and in the phase separator 1 the organic solvent present in the gas phase and, if still present, the water vapor is separated from the polymer particles and the condensed water vapor.

In the present invention, the phase separator 1 is thus a container or a device, respectively, for separation of the gaseous components from the liquid and solid components.

Suitable phase separators for separating a gaseous phase of a liquid and solid phase are basically known to the person skilled in the art. Exemplary phase separators may be mentioned at this point, which work by means of a centrifugal separation (centrifugal separator), for example, a cyclone.

The gaseous organic solvent and, if still present, the water vapor can exit the phase separator 1 preferably via the top, while the polymer particles and condensed water vapor preferably leave the phase separator via a bottom outlet. As already mentioned above, the mixture supplied to the phase separator 1 has a very low water vapor content. Consequently, it is also preferred that the gaseous phase separated in the phase separator 1 has a water vapor content that is as low as possible.

In the present invention, it may be preferred that the gaseous organic solvent separated from the phase separator 1 is supplied to a condenser. In this condenser the organic solvent condenses and can fed to a solvent work up.

The pressure in the phase separator 1 can be varied over a wide range and is for example in the range of 0.1-10 bar absolute, preferably in the range of 0.5-3 bar abs. or 0.7-1.3 bar abs.

In the following steps no prolonged thermal treatments (e.g. in a hot, stirred water bath) are necessary since in step (ii) of the process according to the invention a very effective degassing of the polymer particles has already been taken place. Consequently, it is not necessary in step (iii) to combine the phase separation additionally with a thermal treatment step for a further devolatilization of the polymer particles. In particular, it is preferred that the polymer particles in step (iii) are not in a hot water bath (e.g. dispersed in a stirred tank) for further degassing. It can therefore be preferred that the phase separator 1 is not a stirred tank (e.g. no continuously operated stirred tank).

It is therefore preferred that the average residence time in the phase separator 1 is minimized. Preferably, the residence time in the phase separator 1 is less than 100 seconds, more preferably less than 20 seconds, more preferably less than 10 seconds or even less than 5 seconds. A suitable lower limit for the average residence time may be for example a value of 0.5 seconds or 2 seconds.

As stated above, in step (iv) of the process according to the invention, the separated polymer particles and the separated condensed water vapor from step (iii) are fed into phase separator 2 and in the phase separator 2 the polymer particles are separated from the condensed water vapor.

In the present invention, the phase separator 2 is a container or a device, respectively, for separating the liquid components of the solid components.

Suitable phase separators for separating a solid phase such as e.g. polymer particles from a liquid phase (e.g. condensed water vapor) are basically known to the skilled person.

For example, the separation can take place in that the polymer particles are separated from the liquid through liquid-permeable polymer collecting unit (e.g. a screen). Another or additional, respectively, possibility is the compression of the polymer particles and thus induced displacement of the condensed water vapor (i.e. the liquid phase).

In a preferred embodiment the phase separator 2 comprises a polymer collecting unit (preferably a sieve) and a polymer compression unit, which has a multi-shaft, preferably twin-shaft compression area and immediately subsequently a single-shaft compression area. In this polymer compression unit with multi-shaft and single-shaft areas compression of the polymer material is done. The feed of the compression unit with the polymer particles is preferably carried out via the multi-shaft area. As shafts of polymer compression unit, for example, worm or screw shafts can be used.

In this preferred embodiment, the polymer particles are deposited on the polymer collecting unit (e.g. a sieve) and then initially supplied to the multi-shaft, preferably two-shaft area of the polymeric compression unit (for example, via an inclined position of the screen). The multi-shaft area can be for example, a compression area with two or more srew shafts. This srew shafts can be in the same or opposite directions. As an example a twin-screw extruder may be mentioned in this context.

The transition from the multi-shaft area into the single-shaft area is preferably accomplished by merely extending a shaft over the entire length of the polymer compression unit, while the other shaft or the other shafts extends or extend only via a partial area polymer compression unit.

Preferably, all the shafts start at the end of the polymer compression unit on which the polymer particles deposited on the collecting unit (e.g. the screen) are supplied. Only one of these shafts extends to the other end of the polymer compression unit. It has been found that by the multi-shaft structure in the feed area the entrainment or entering of polymer into the polymer compression unit is optimized, while the single-shaft structure in the rear part of the polymer compression unit enables a better pressure build-up and therefore a better compression of the polymer material.

At the output of the polymer compression unit, a cutting unit may be mounted for forming polymer particles of uniform size, for example in the range of 0.5-20 mm, preferably 1-10 mm or 2-5 mm.

Subsequently, the polymer particles may have been dried to the desired residual humidity by a common drying apparatus.

The liquid phase separated in phase separator 2 can be aspirated and pumped into a tank. Here, auxiliaries may be added to the liquid phase affecting the formation of particles in the vaporizer. From this tank the liquid phase can optionally be recycled as washing water or removed from the system proportionally, respectively.

Furthermore, the phase separator 2 is also used for sealing the procedural structure to the atmosphere.

Also in the phase separator 2, a relatively small average residence time may be used. Preferably, the mean residence time in the phase separator 2 is from 1 second to 100 seconds, more preferably 5 seconds to 20 seconds.

Although it is not excluded in the present invention that between steps (i)-(iv), further treatment steps can be provided, it is preferred that the individual steps (i)-(iv) follow one another directly.

In the process of the present invention, the short residence time of the polymer within the chemical engineering structure and the associated very low residence time from the inflow into the atomizing area until the exit of the second phase separator results in a gentle product handling, particularly in the case of temperature-sensitive polymers. The unit can be designed very compact, which leads to a large space savings. The process is very stable even at low flow rates, thereby realizing small dimensions. The unit can be changed very quickly in their configuration and is therefore retrofitted without great loss of time when changing products. In addition a significant reduction of cleaning time is achieved.

According to another aspect, the present invention relates to a device or unit, respectively, for separating a polymer from a polymer solution or dispersion comprising (a) an vaporizer,
(b) a polymer degassing container,
(c) a first phase separator for separating a gaseous phase from a liquid phase and solid phase,
(d) a second phase separator for separating a liquid phase from a solid phase.

With regard to the vaporizer it may be referred to the above statements.

The vaporizer has one or more equipment elements for contacting a polymer solution with water vapor. Such equipment elements are basically known to the skilled person. For example, a multi-component nozzle (e.g. two-component or three-component nozzle) may be used.

The opening through which the water vapor is introduced into the vaporizer may have different shapes. For example, this opening can be circular or oval or alternatively, slit-shaped. In the present invention, it is possible that the water vapor is introduced only via an opening or alternatively via two or more openings in the vaporizer. In order to introduce the polymer solution into the vaporizer appropriate bores can be drilled in the wall of the vaporizer, preferably cylindrical and/or conical holes. A bore diameter of 0.1 to 8 mm, preferably from 0.5 to 6 mm, or 1.0 to 5.0 mm has been proven expedient. However, other bore diameters are also useful in the present invention.

In a preferred embodiment of the equipment elements for introducing the polymer solution and the water vapor are arranged such that the inflow of the polymer solution into the vaporizer is at an angle of 45-100°, more preferably 60-95°, more preferably 80-90° to the inflow of the water vapor into the vaporizer.

Regarding the polymer degassing container it may be referred to the above statements.

The dimensions and the geometry of the polymer degassing container can be varied over a wide range. For example, a tubular polymer degassing container is convenient. An appropriate length of such a tubular polymer degassing container is from 0.5 to 30.0 m, for example, more preferred 2.0-20.0 m or 4.0-10.0 m. A suitable diameter is for example in the range of 15-150 mm, preferably 25-100 mm or 40-80 mm.

With regard to the first phase separator (i.e. phase separator 1) for separating a gaseous phase from a liquid and solid phase it may be referred to the statements made above.

Suitable phase separators for separating a gaseous phase from a liquid and solid phase are basically known to the person skilled in the art. Exemplary phase separators, which work by means of centrifugal separation (centrifugal separator), e.g. a cyclone, can be mentioned at this point.

Preferably, the first phase separator is designed in such a manner that gaseous components exit the phase separator via the top and liquid phases or solid phases, respectively, can exit the phase separator through a bottom outlet.

As mentioned above, the device includes a second phase separator (i.e. phase separator 2) for separating a liquid phase from a solid phase.

With regard to the preferred characteristics of this phase separator 2 it may be referred to the statements made above.

Preferably, the second phase separator includes a polymer compression unit, which has a multiple shaft, preferably two-shaft compression area and a single shaft compression area following directly.

In a preferred embodiment the phase separator 2 comprises a polymer collecting unit (preferably a sieve) and a polymer compression unit, which has a multiple shaft, preferably two-shaft compression area and thereafter a single shaft compression area. In this polymer compression unit with multiple shaft and single shaft areas the compression is effected to the polymer material. The polymer collecting unit and the polymer compressing unit are preferably mutually arranged in such a manner that the loading of the compression unit is carried out with the polymer in the multipleshaft area and the polymer leaves the conveying unit via the single shaft area. For example, screw shafts can be used as shafts.

In the polymer compression unit, it is preferred that only one of the shafts is extended over the entire length of the polymer compression unit, while the other shaft or other shafts are extended only over a partial region of the polymer compression unit. Preferably, all the shafts start at the end of the polymer compression unit, where the polymer is supplied. Only one of these shafts extends to the other end of the polymer compression unit.

At the outlet or in the vicinity of the outlet of the polymer compression unit, a cutting unit is attached for forming polymer particles of uniform size, for example in the range of 0.5-20 mm, preferably 1-10 mm or be 2-5 mm.

The components (a)-(d) are preferably mutually arranged, so that in the implementation of a separation process, a polymer of these components can pass through in the order of (a) ->(b) ->(c) ->(d).

The present invention is explained in more detail by the following examples.

EXAMPLES

Example 1

100 kg/h solution of an aliphatic solvent and a thermoplastic elastomer having a solid's content of 12.5% by weight dissolved therein is added in a two-component nozzle with superheated water vapor of about 16 bars. The mass ratio of water vapor to the polymer solution is approximately 0.86. In this atomization the solvent is evaporated in the atomization chamber while water vapor condenses. However, the condensation of the water vapor is incomplete. This results in a three-phase mixture containing vaporized gaseous organic solvent, water vapor, condensed water vapor in the form of droplets and polymer particles comprised in the vaporizer. The polymer particles still contain an organic solvent.

The three-phase mixture from the vaporizer flows through a tubular reactor of a length of 8 m having the dimensions of 55.1 mm. This tubular reactor acts on the polymer particles as polymer degassing container. While the mixture flows through the tubular polymer degassing container, the polymer particles are in thermal contact with the remaining water vapor, whereby organic solvent is evaporated that is still in these polymer particles, and converted into the gas phase. The average residence time in the tubular polymer degassing container is approximately 0.2 seconds.

Subsequently, the gaseous solvent and the excess water vapor are separated at pressures of 0.95 bar abs in a cyclone, which acts as a phase separator 1. The separated organic solvent is condensed in a suitable condenser with cold water at temperatures between 6 and 10° C. The polymer particles and condensed water vapor are removed via a bottom outlet and fed into a second phase separator.

In the second phase separator, the polymer particles are collected on a sieve and fed to the two-shaft end of the polymer compression unit. Only one of these shafts extends over the entire length of the polymer compression unit, so that after leaving the two-shaft compression area the polymeric material comes into a single shaft compression area and leaves it via the polymer compression unit. On leaving the polymer compression unit, the polymer is cut by a cutting unit into polymer particles having a uniform size of about 5 mm. The phase separator serves to separate the liquid phase from the polymer, the recycling of vapor condensate into the processing circuit and the pressure sealing of the system.

Example 2

200 kg/h of rubber solution of a cycloaliphatic solvent having a solids content of 15% are added in a three-component nozzle with superheated water vapor at a pressure of about 16 bar and conditioned washing water at a temperature of ca. 85° C. The mass ratio of water vapor to polymer solution is 1.15, the ratio of mass flow of washing water to rubber solution is 3.50. In this atomization in the atomization chamber, the solvent is evaporated while water vapor condenses. However, the condensation of the water vapor is incomplete. This results in a three-phase mixture containing vaporized gaseous organic solvent, water vapor, condensed water vapor in the form of droplets and polymer particles in the vaporizer. The polymer particles still contain organic solvent.

The three-phase system is passed through a tubular reactor of a length of 4.0 m having the dimension of 44.3 mm. This tubular reactor acts on the polymer particles as degasification container. While the mixture flows through the tubular polymer degassing container, the polymer particles are in thermal contact with the remaining water vapor, whereby organic solvent is evaporated that is still in these polymer particles, and converted into the gas phase. The average residence time in the tubular polymer degassing container is approximately 0.1 second.

Subsequently, the gaseous solvent and the excess of water vapor are separated from the washing water and the polymer particles at pressures of 0.85 bar abs in a cyclone, which acts as a phase separator 1. The separated organic solvent is condensed in a suitable condenser with cold water temperatures between 6 and 10° C. The polymer particles and condensed water vapor are removed via a bottom outlet and fed to a second phase separator.

In the second phase separator, the polymer particles are collected on a sieve and fed to the two-shaft end of the polymer compression unit. Only one of these shafts extends over the entire length of the polymer compression unit, so that the polymeric material after leaving the two-shaft compression area comes into a single-shaft compression area and leaves via this to the polymer compression unit. On leaving the polymer compression unit, the polymer is cut by a cutting unit into polymer particles of uniform size of 3 mm. The phase separator is used to separate the liquid phase from the polymer, the recycling of vapor condensate and the washing water in the processing cycle for the energetical and environmental optimization and the pressure sealing of the system.

The invention claimed is:

1. A process for separating a polymer from a polymer solution or a polymer dispersion comprising the following steps:
   (i) a solution or dispersion of a polymer in an organic solvent is sprayed in a vaporizer by bringing it into contact with water vapor, wherein a part of the organic solvent is converted into gas phase, a part of the water vapor condenses in the form of droplets and polymer particles are obtained which still contain organic solvent,
   (ii) the mixture obtained in the vaporizer is transferred into a polymer degassing container and flows through the polymer degassing container, where by thermal contact of the polymer particles and the water vapor the organic solvent contained in the polymer particles is at least partially removed from the polymer particles and converted into gas phase,
   (iii) the mixture leaving the polymer degassing container is transferred into a phase separator 1 where the organic solvent contained in the gas phase and any remaining water vapor, are separated from the polymer particles and the condensed water vapor,
   (iv) the separated polymer particles and the separated condensed water vapor from step (iii) are transferred into a phase separator 2 where the polymer particles are separated from the condensed water vapor.

2. The process according to claim 1, wherein the polymer solution is brought into contact with the water vapor in a multiple fluid nozzle.

3. The process according to claim 1, wherein the polymer solution enters the vaporizer at an angle of 45-100° compared to the entering of the water vapor into the vaporizer.

4. The process according to claim 1, wherein the water vapor introduced in the vaporizer has a pressure in the range of from 3-25 bar; and/or the mass ratio of the water vapor to the polymer solution in step (i) is in the range of 0.2-3.

5. The process according to claim 1, wherein the average diameter of the polymer particles formed in the vaporizer is in the range of 0.01-5 mm.

6. The process according to claim 1, wherein the polymer degassing container comprises a tubular section; and/or the mixture obtained in the vaporizer of step (i) flows through the polymer degassing container continuously and the condensed water vapor is in the form of droplets.

7. The process according to claim 1, wherein the average dwell time in the polymer degassing container is 0.1-10 seconds.

8. The process according to claim 1, wherein the separation of the organic solvent contained in the gas phase and any remaining water vapor from the polymer particles and the condensed water vapor is accomplished via centrifugal force separation in the phase separator 1.

9. The process according to claim 1, wherein the average dwell time in the phase separator 1 is less than 100 seconds.

10. The process according to claim 1, wherein in step (iv) the separation of the polymer particles from the condensed water vapor is accomplished by compressing the polymer particles; and/or wherein the phase separator 2 comprises a polymer collecting unit and a polymer compressing unit which comprises a multiple shaft compression area and a single shaft compression area.

11. A system or facility for separating a polymer from a polymer solution or polymer dispersion, comprising
(a) a vaporizer,
(b) a polymer degassing container,
(c) a first phase separator for separating a gaseous phase from a liquid phase and a solid phase,
(d) a second phase separator for separating a liquid phase from a solid phase, wherein the second phase separator (d) comprises a polymer compression unit, which comprises a multiple shaft compression area and a single shaft compression area.

12. The system according to claim 11, wherein the vaporizer comprises elements for introducing polymer solution and water vapor and said elements are arranged such that the polymer solution enters the vaporizer at an angle of 45-100° compared to the entering of the water vapor into the vaporizer.

13. The system according to claim 11, wherein the polymer degassing container comprises a tubular section.

14. The system according to one of claim 11, wherein the first phase separator (c) is a centrifugal force separator.

15. The system according to claim 11, wherein the second phase separator (d) comprises a polymer collecting unit, and the polymer collecting unit and the polymer compression unit are arranged to each other such that charging the polymer compression unit with a polymer can be accomplished in the multiple shaft compression area.

\* \* \* \* \*